W. S. DEEDS.
ELECTRIC CONTROLLER.
APPLICATION FILED FEB. 18, 1908.
907,752.
Patented Dec. 29, 1908.
4 SHEETS—SHEET 1.
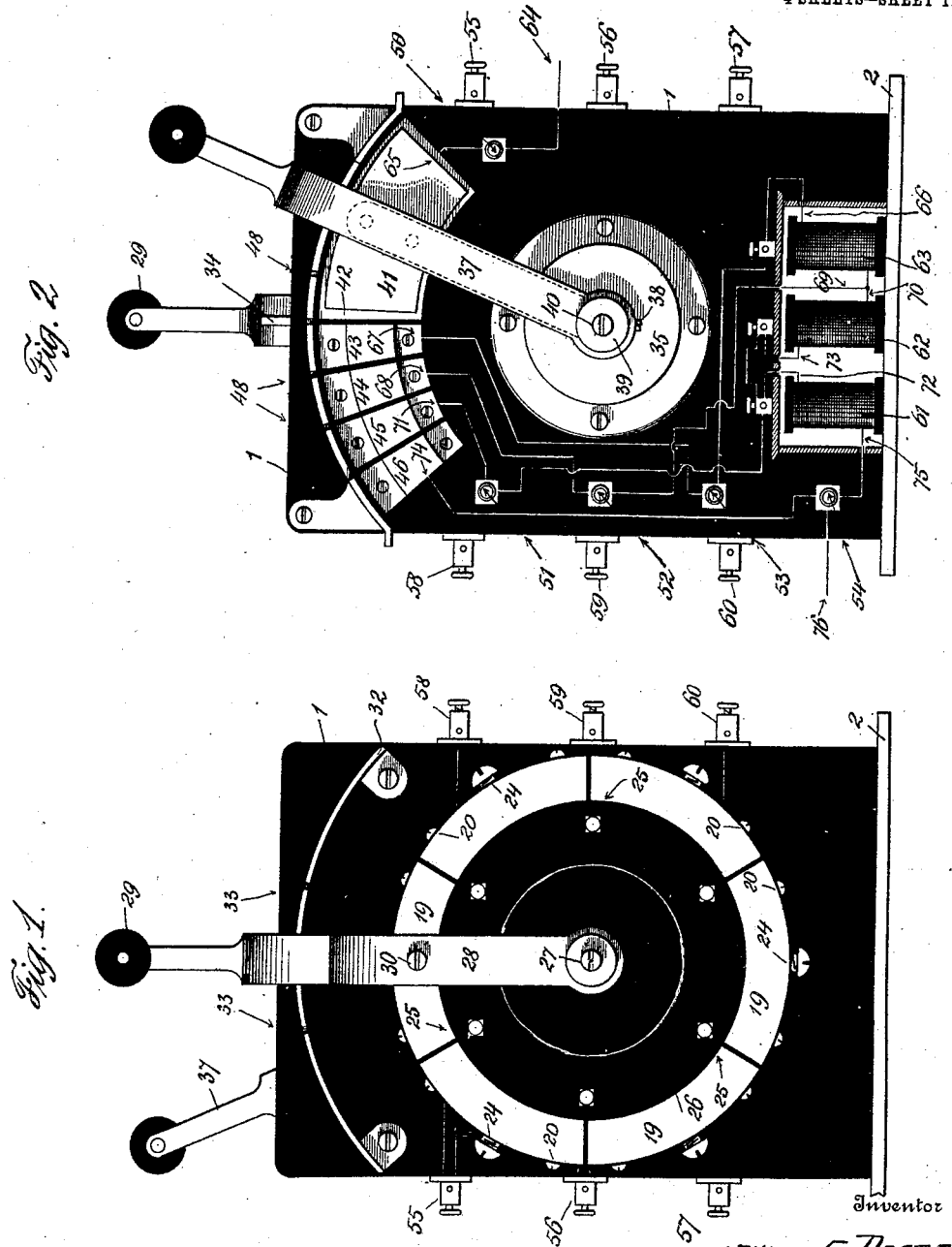
Witnesses
A. H. Rabsag,
N. H. Butler.
Inventor
William S. Deeds
By H. C. Evert
Attorneys

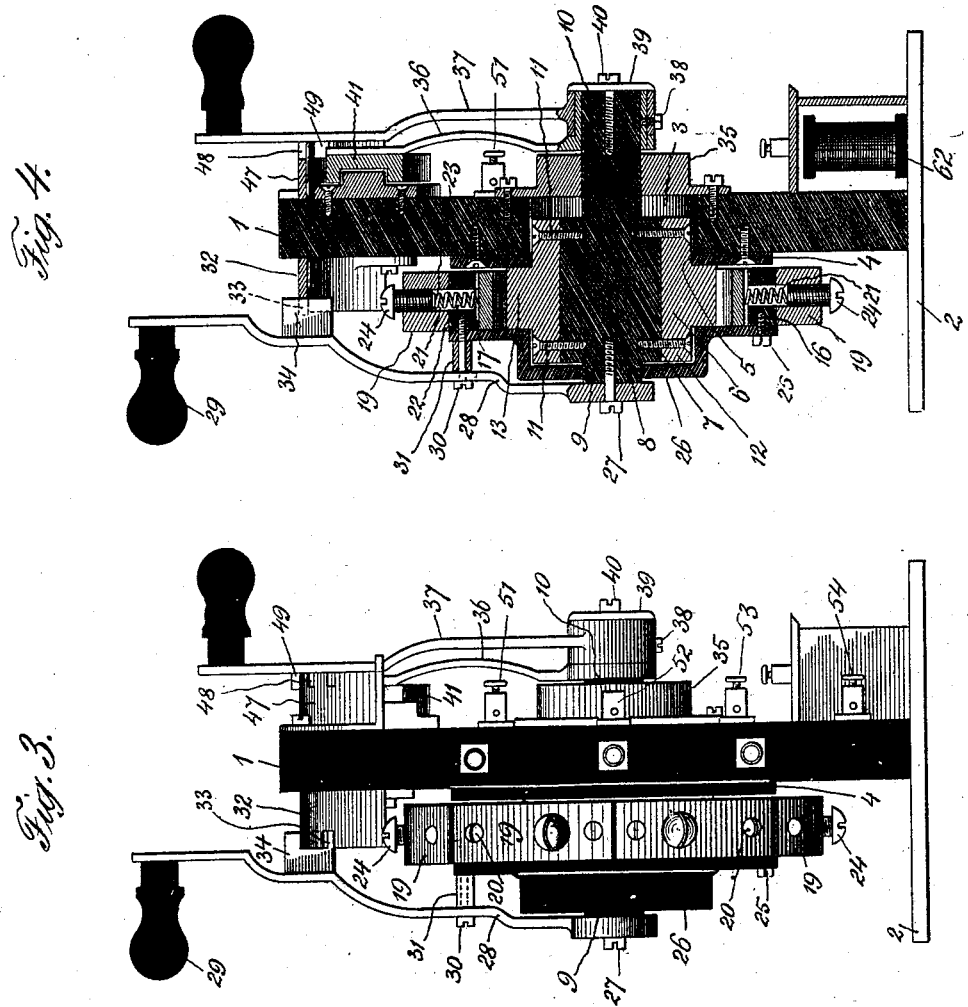

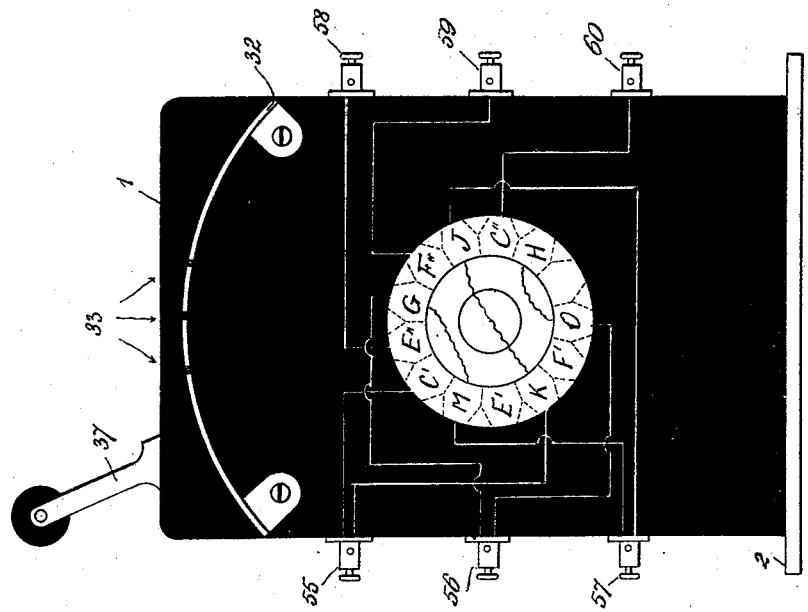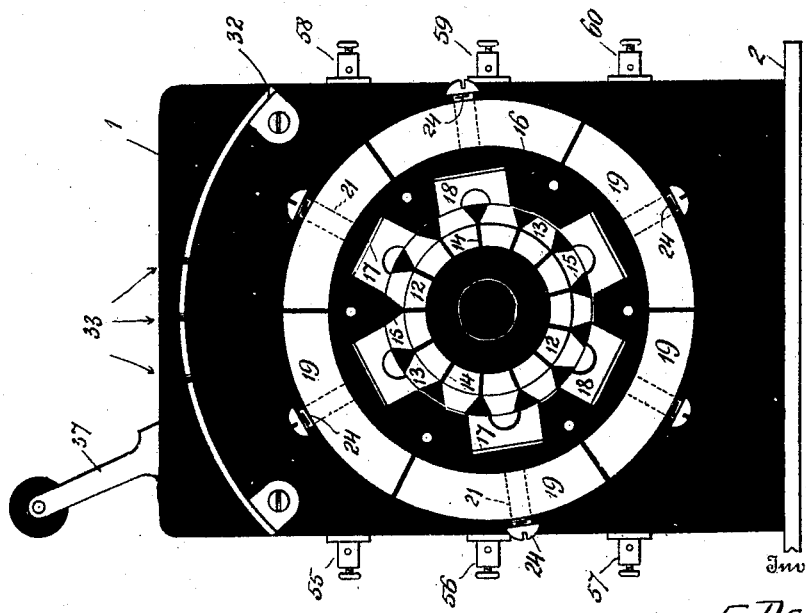

W. S. DEEDS.
ELECTRIC CONTROLLER.
APPLICATION FILED FEB. 18, 1908.
907,752.
Patented Dec. 29, 1908.
4 SHEETS—SHEET 4.
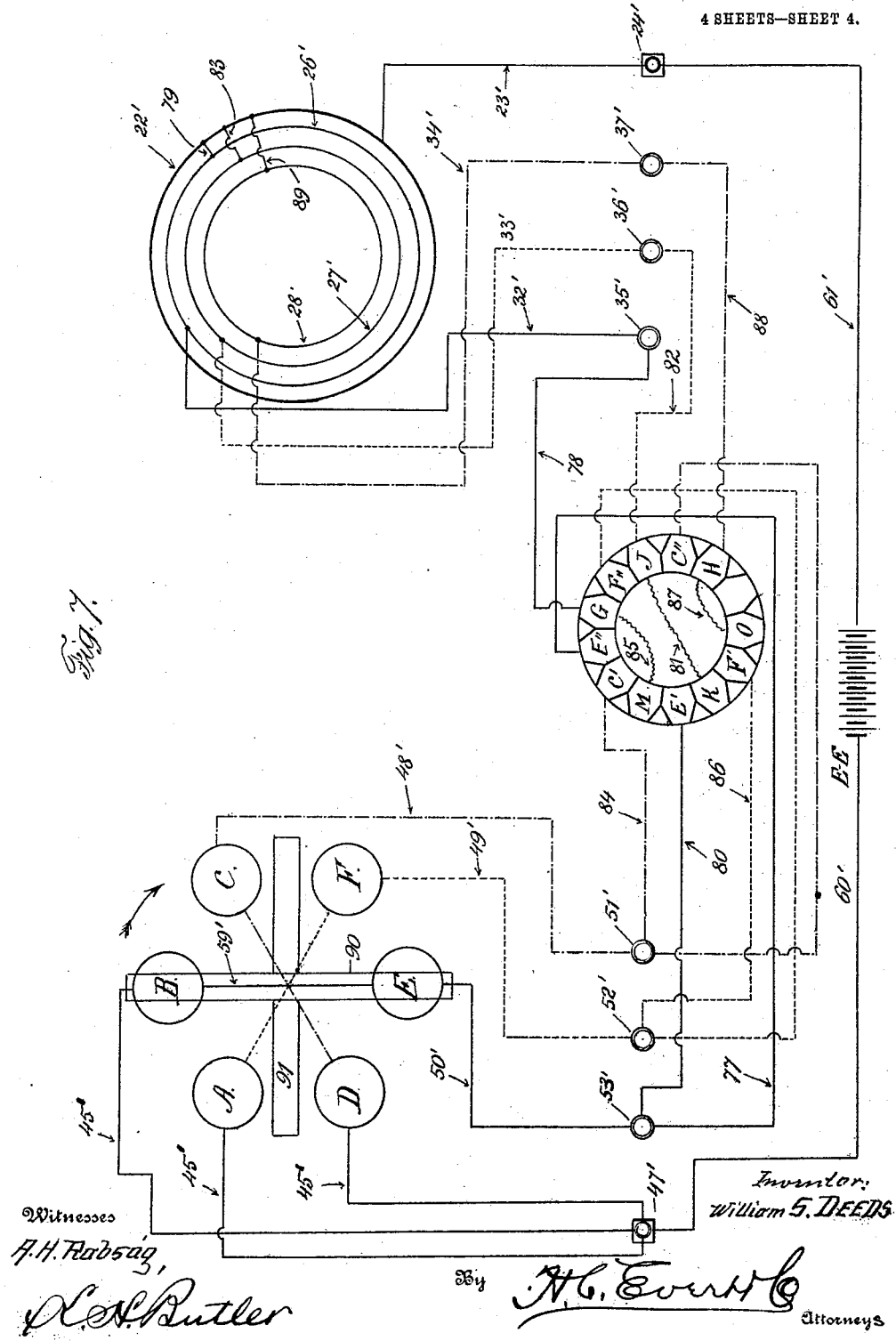
Witnesses
A. H. Rabsag,
X. C. H. Butler
Inventor:
William S. Deeds
By H. C. Evert Co.
Attorneys

UNITED STATES PATENT OFFICE.

WILLIAM S. DEEDS, OF PITTSBURG, PENNSYLVANIA, ASSIGNOR OF ONE-HALF TO JAMES M. GRAHAM, OF PITTSBURG, PENNSYLVANIA.

ELECTRIC CONTROLLER.

No. 907,752.          Specification of Letters Patent.          Patented Dec. 29, 1908.

Application filed February 18, 1908. Serial No. 416,588.

*To all whom it may concern:*

Be it known that I, WILLIAM S. DEEDS, a citizen of the United States of America, residing at Pittsburg, in the county of Allegheny and State of Pennsylvania, have invented certain new and useful Improvements in Electric Controllers, of which the following is a specification, reference being had therein to the accompanying drawing.

This invention relates to electric controllers, and the invention has for its object the provision of a novel controller, wherein positive and reliable means are provided for controlling the operation of a motor.

My improved controller is particularly designed for a wireless armature induction motor, forming the subject-matter of a companion application.

The present invention aims to provide a compact, durable and comparatively inexpensive controller that can be easily manipulated.

The invention will be described in detail, also its application to my motor, whereby the operation of the controller will be fully understood.

Reference will now be had to the drawings forming a part of this specification, wherein:

Figure 1 is a front elevation of my controller, Fig. 2 is a rear elevation of the same, Fig. 3 is a side elevation, Fig. 4 a vertical sectional view, Fig. 5 is a rear elevation of the controller with parts thereof removed, Fig. 6 is a rear elevation of the insulated standard forming part of my controller, and Fig. 7 is a diagrammatic view of the wiring of my controller in connection with my motor.

In the accompanying drawings, 1 designates a standard or slab made of an insulating material, such as marble. This standard is supported by a base plate 2, and is provided with a central opening 3. The front side of the standard 1 is provided with a plate of insulation 4 having an opening 5 alining with the opening 3, but of less diameter. In the opening of the plate 4 is journaled a metallic cylindrical head 6 having a bore 7 for a shaft of insulation 8, this shaft having a reduced end 9 at the front side of the controller and a reduced portion 10 of greater length than the reduced portion 9, and extending through the opening 3 to the rear side of the controller. The shaft 8 is fixed in the cylindrical metallic head 6 by a plurality of screws 11. The cylindrical head 6 is constructed of a plurality of circumferentially arranged blocks 12, (see Fig. 5), these blocks having beveled extensions 13 forming an annular collar around the head 6. The blocks 12 are insulated from one another, as at 14, and the extensions 13 are insulated by V-shaped insertions 15, the area or outer face of said insertions being approximately equivalent to the extensions 13, thereby providing an alternate arrangement of the extensions 13 and insulation insertions 15 upon the periphery of the head 6. Movably mounted upon the head 6 is a collar of insulation 16 having radially disposed recesses 17 formed therein for metallic couplers 18, these couplers being adapted to bridge two of the extensions 13 or two of the insulated insertions 15. Surrounding the collar 16 is a plurality of insulated metallic segments 19, said segments being secured to the collar 16 by screws 20 (see Fig. 3). The segments 19, intermediate their ends, are formed with openings 21, these openings alining with openings 22 formed in the collar 16 and communicating with the recesses 17 thereof. In the openings 21 and 22 are arranged coil springs 23, these springs being retained in said openings by set screws 24 adjustably mounted in the openings 21. The object of the springs 23 is to normally maintain the couplers 18 in frictional engagement with the periphery of the head 6. Secured to the insulating collar 16 by screws 25 is a cap of insulation 26, said cap embracing the front side of the head 6 and the reduced end 9 of the shaft 8. In the reduced end 9 of the shaft 8 is fixed a screw 27 and movably mounted upon said screw is a reverser lever 28. This lever extends upwardly above the standard 1 and is provided with a suitable handle 29, preferably of some insulating material. The handle 29 is secured to the collar 16 by a screw 30 having a spacer sleeve 31. On the front of the standard 1, near the upper end of said standard is secured a curved keeper 32 having notches 33 formed therein to receive the latch 34 of the reverser lever 28. This lever 28 is preferably made of resilient material to permit its being sprung sufficiently to withdraw the latch 34 from the notches 33 of the keeper 32.

The construction just described comprises the reverser side of my controller, and reference will again be had to the detail construction thereof, when the operation of the controller is described.

Referring now to the rear or speed varying side of the standard 1, said standard is provided with a bearing 35 for the reduced portion 10 of the shaft 8. Upon the said reduced portion 10 of the shaft 8 is movably mounted a resilient contact arm 36 and an operating lever 37, said arm and said lever being secured together by a set screw 38 and retained upon the reduced portion of the shaft 8 by a cap 39 and a screw 40. The resilient arm 36 is provided with a contact block 41, adapted to engage contacts 42, 43, 44, 45 and 46, suitably secured to the rear face of the standard 1 near its upper end. Above these contacts is arranged a keeper 47 having notches 48 formed therein for a latch 49 carried by the operating lever 37.

Upon the rear side of the standard 1 is arranged five binding posts 50, 51, 52, 53 and 54, while the vertical edges of said standard are provided with binding posts 55, 56, 57, and 58, 59 and 60, the posts 55 to 57 inclusive being located upon one edge of the standard 1, and the posts 58 to 60 inclusive upon the opposite edge of said standard.

Upon the base plate 2, at the rear side of the standard 1, is arranged a rheostat of a conventional form, the rheostat as illustrated comprising three resistance coils 61, 62 and 63. I desire it to be understood that any number of coils can be used, also any number of contacts at the upper end of the standard 1.

Connected to the binding post 50 is a feed wire 64 leading from a suitable source of electrical energy. The binding post 50 is connected by a wire 65 to the contact 42. Coil 63 is connected by a wire 66 to binding post 53, and by a wire 67 to contact 43. Contact 44 is connected by a wire 68 to binding post 52 and by a wire 69 to the connecting wire 70 of the coils 62 and 63. Contact 45 is connected by a wire 71 to binding post 51 and by a wire 72 to coil 61. Coil 62 is connected by a wire 73 to coil 61. Contact 46 is connected by a wire 74 to binding post 54 and by a wire 75 to coil 61. Another feed wire 76 connects with the binding post 54.

When the lever 37 is moved to the first notch of the keeper 47, and the contact block 41 bridges the contacts 42 and 43, the circuit is as follows: wire 64 to binding post 50, wire 65 to contact 42, across block 41 to contact 43, wire 67 to binding post 53, wire 66 to coil 63, wire 70 to coil 62, wires 73 and 72 to coil 61, wire 75 to post 54 and to wire 76. The resistance cut in therefore includes the three coils 61, 62 and 63. When the lever 37 is moved to the second notch and contacts 42 and 44 are bridged, the circuit is from contact 44 through wire 68 to post 52, wire 69 to coil 62, wires 73 and 72 to coils 61, wire 75 to post 54 and then to wire 76. With the block 41 bridging contacts 42 and 45, the circuit is through wire 71, post 51, wire 72 to coil 61, wire 75 to post 54 and then to wire 76. When the lever 37 is thrown to its limit to bridge contacts 42 and 46, the circuit is by wire 74 direct to the post 54 and to wire 76.

Reference will now be had to the reverser side of the controller and referring to Fig. 7 of the drawings, I have illustrated diagrammatically the reverser in connection with my induction motor, but I have not deemed it necessary to illustrate diagrammatically the speed varying side of the controller, as it will be understood that the wires 64 and 76 are connected to the feed wires of my motor.

A, B, C, D, E and F represent the stationary electro-magnets of my motor and 22', 26', 27' and 28' the circular wires of the automatic switch of the motor.

24', 37', 36' and 35', 51', 52', 53' and 47' represent the binding posts of the motor.

Assuming that my motor is traveling in the direction of the arrow (Fig. 7), the circuit through the electro-magnets B and E, the reverser and the automatic switch would be as follows: Starting with a suitable source of electrical energy E, E, the circuit is through wire 60' to post 47', wire 45' to electro-magnet B, wire 59' to electro-magnet E, wire 50' to post 53', wire 77 to extension E''. Here one of the metallic couplers 18 connects said extension E'' to extension G and the circuit continues through wire 78 to post 35', wire 32', to circular wire 26', wire 79 to circular wire 22', wire 23' to post 24', and wire 61' to E, E.

The main part of the circuit through electro-magnets D and C is represented by a dot and dash line and the extension C'' is coupled to the extension H in a similar manner to the extensions E'' and G.

The principal part of the circuit through the electro-magnets A and F is illustrated by a dotted line, and in a like manner the extension F'' is coupled to the extension J.

Now, by referring to Fig. 5 of the drawings, it will be observed that three couplers are in use as conductors, while three couplers remain idle or bridge insertions of insulation. To reverse the direction of my motor, the lever 28 is moved one notch in the keeper 32, which causes a cessation in the operation of the motor. Now, upon the lever 28 being moved to the third notch, the couplers 18 that serve as conductors now become idle, and the other couplers become the conductors.

The circuit through the electro-magnets B and E is as follows: Starting at E, E the circuit is through wire 60', post 47', wire 45' to magnet B, wire 59' to magnet E, wire 50' to post 53', wire 80 to extension E'. Here a coupler connects said extension to extension K, and the circuit continues through a wire 81 to extension J, wire 82 to post 36'', wire 33' to wire 27', wires 83, 22' and 23' to post 24' and wire 61' to E, E. When the circuit is through the electromagnets D and C a wire 84 is used, which connects with extension C', and this extension C' is coupled to extension M by wire 85 to extension G, over wire 78 to post 35' etc. to E, E. When the circuit is through A and F, the wire 86 is used, this wire connecting with extension F', which is coupled to extension O, and from there the circuit passes through wire 87 to extension H, wire 88 to post 37', wire 34' to circular wire 28', wire 89 to circular wire 22', etc. to E, E.

When the reverser lever is moved to cause a cessation in the operation of the motor, two of the arms of my wireless armature will be located midway between two sets of electro-magnets. For instance, the arms 90 will be held by the electro-magnets B and E, while the arms 91 will be located midway between the electro-magnets A, D, C and F. Immediately upon the reverser lever being swung to the third notch, the electro-magnets A, D, C and F attract the arms 91 in the proper direction in which the motor is operated. It will of course be understood that the speed varying side of the controller is used in connection with the reverser side when the motor is being reversed. It will thus be observed that the current flows through the stationary electro magnets of the motor in the same direction in both positions of the reversing switch, and that the direction of rotation of the armature depends upon which of the electro magnets are first energized.

As before stated, the lever 28 is moved one notch and the motor thereby brought to a state of rest; this position of the lever 28 is shown in Fig. 1. Assuming that when the motor stops, or is brought to a state of rest as stated above, that the armature is in the position shown in Fig. 7. Now, if the lever 28 be moved to the right (Fig. 1) and, through the electrical connections heretofore described, the electro-magnets D and C thereby energized, the armature would immediately be drawn or attracted in the direction of the arrow shown in Fig. 7. But, if the lever 28 should be moved to the left (Fig. 1) and an electric circuit thereby established so as to energize magnets A and F, the direction of rotation of the armature would be reversed, and the armature would travel in the reverse direction to that indicated by the arrow in Fig. 7. It will be noted therefore, that the motor is first brought to a state of rest, and that the direction of rotation of the armature when the motor is again started, depends upon which set of electromagnets are first energized.

As illustrated in Fig. 6, the wires connecting the various extensions and the binding posts 55 to 60 inclusive are arranged upon or embedded in the slab or standard 1.

Having now described my invention what I claim as new, is:—

1. A controller embodying an insulated standard, a head mounted in said standard and having a plurality of circumferentially arranged insulated extensions, a shaft mounted in said head, a collar of insulation movably mounted upon said shaft and surrounding said head, a plurality of spring-pressed couplers mounted in said collar for frictionally engaging said head and bridging said extensions, a reverser lever movably connected to said shaft and fixed to said collar, a keeper carried by said standard for holding said lever to an adjusted position, a plurality of contacts carried by said standard, a resilient arm movably mounted upon said shaft, a contact block carried by said arm for bridging said contacts, a lever for moving said arm, a keeper carried by said standard for maintaining said lever to an adjusted position and a rheostat in circuit with said contacts, substantially as described.

2. A controller embodying a standard, a head mounted therein and having a plurality of circumferentially arranged insulated extensions, a shaft mounted in said head, a collar of insulation movably mounted upon said shaft, a plurality of spring-pressed couplers arranged in said collar for frictionally engaging said head and bridging said extensions, a plurality of contacts carried by said standard, a movable contact block for engaging said contacts, a rheostat in circuit with said contacts, and means movably connected to said shaft for independently moving said collar and said contact block.

3. A controller of the type described comprising an insulated standard, a head mounted therein, a plurality of circumferentially arranged insulated extensions carried by said head, a collar of insulation movably mounted upon said head, a plurality of spring-pressed couplers arranged in said collar for bridging said extensions, a plurality of contacts carried by said standard, a movable contact block for bridging said contacts, a rheostat in circuit with said contacts, and means supported by said head for independently moving said collar and said contact block.

4. A controller of the type described comprising a standard, a head arranged in said standard, a plurality of circumferentially arranged insulated extensions carried by said head, a collar of insulation movably mounted upon said head, a plurality of spring-pressed couplers arranged in said collar for bridging said extensions, and means supported by said head for moving said collar.

5. The combination with a motor having stationary electro-magnets, of a plurality of circumferentially arranged insulated extensions in circuit with said electro-magnets, a collar of insulation surrounding said extensions, a plurality of spring-pressed couplers arranged in said collar for bridging said extensions, means for moving said couplers to bridge certain extensions to operate said motor in one direction, and to bridge certain extensions to operate said motor in the opposite direction.

6. The combination of a motor, a plurality of circumferentially arranged insulated extensions in circuit with said motor, a collar of insulation surrounding said extensions, spring-pressed insulated couplers arranged in said collar and adapted to bridge some of said extensions to operate said motor in one direction, and other of said extensions to operate the motor in the opposite direction.

7. The combination of a motor, a plurality of insulated extensions in circuit with said motor, a collar of insulation surrounding said extensions, and spring-pressed insulated couplers arranged in said collar for controlling the direction of operation of said motor.

In testimony whereof I affix my signature in the presence of two witnesses.

WILLIAM S. DEEDS.

Witnesses:
   Max H. Srolovitz,
   K. H. Butler.